United States Patent [19]

Yang

[11] Patent Number: 5,518,598

[45] Date of Patent: May 21, 1996

[54] TREATMENT EQUIPMENT FOR DRINKING WATER

[76] Inventor: Shui-Chuang Yang, No. 29, Min-Tsu Road, Hsueh Chia Jenn, Tainan Hsien, Taiwan

[21] Appl. No.: 444,694

[22] Filed: May 19, 1995

[51] Int. Cl.$^6$ .................................................. C02F 1/461
[52] U.S. Cl. ........................ 204/240; 204/241; 204/275
[58] Field of Search .................................. 204/238–241, 204/275

[56] References Cited

U.S. PATENT DOCUMENTS

| | | | |
|---|---|---|---|
| 3,192,142 | 6/1965 | Vellas et al. | 204/240 X |
| 4,152,238 | 5/1979 | Okazaki | 204/241 X |
| 4,917,782 | 4/1990 | Davies | 204/240 X |
| 4,946,574 | 8/1990 | Lin | 204/240 X |
| 5,007,994 | 4/1991 | Snee | 204/240 |
| 5,328,584 | 7/1994 | Erickson et al. | 204/238 X |

*Primary Examiner*—Donald R. Valentine
*Attorney, Agent, or Firm*—Pro-Techtor International

[57] ABSTRACT

The present invention relates to a central treatment equipment of drinking water for delivering tap water to a water electrolysis device to remove chlorine gas or antiseptic solution from tap water while to separate weak-base water with weak-acid water for respectively delivery into a drinking cylinder and use water cylinder. In said drinking cylinder having a heater for heating the drinking water, and such drinking water will be delivered to a storage cylinder when boiled and will be delivered to drinking tubing for drinking with the help of outlet pump. Water in said use water cylinder will be directly delivered to tap water tubing as cleaning water. In addition, the present invention has a CIP loop for automatic cleaning in a fixed period.

2 Claims, 3 Drawing Sheets

5,518,598

TREATMENT EQUIPMENT FOR DRINKING WATER

BACKGROUND OF THE INVENTION

The present invention relates to a central treatment equipment of drinking water, and particularly to a central treatment equipment of drinking water with safety and sanitation for the supply to the whole member in an organization or residence or to each unit of a building.

Most of the conventional drinking water units are constructed of a single body of which filter softener, heater, cooler and outlet valve of the drinking water supply system are mounted on one drinking machine with small capacity to limit for the supply to one place and one person at a time; if for a public occasion such as hospital, office building, school or social-gathering place for drinking water supply to a multiple persons at a time, a number of single-unit drinking water machines must be installed on different locations respectively in order to avoid coming this way and that or waiting on line for drinking water; however, if a large number of drinking machines are needed (ten or more than one hundred units), not only equipment cost is high but also power supply or fuel for boiling water may cause another waste; in addition, each machine should require maintenance that will cause the problem not to meet the requirement of economic benefit.

Another, in a common residence though it has no problem of inadequate drinking equipment due to excessive number of users in an organization or public place, however each family that has installed one drinking water machine may increase the number of equipment installed in the family and it may suffer sanitation problem owing to their neglect of maintenance.

On the other hand, some drinking machines have merely filtered fresh water without boiled for drinking, which is really doubtful in respect of safety and sanitation. Another, water drinking machines in general have softened water by means of cation treatment device and it is merely effective to soften hard water but not effective to remove chlorine gas, antiseptic solution and bleach from tap water. To improve the defect of such cation treatment device on the market there has a water electrolysis device to replace the cation exchanger.

The water electrolysis device is provided for the electrolysis of tap water by taking advantage of water inclination toward weak acid while carrying anion owing to tap water containing chlorine gas, antiseptic solution and bleach, and the inclination of standard drinking water toward weak base while carrying cation, and it also has a microprocessor for dividing tap water into two different qualities for discharge through different tubes. Though such water electrolysis device may accomplish excellent result of water treatment, however direct discharge of acid water separated has caused water resource waste.

SUMMARY OF THE INVENTION

One object of the present invention is to provide a central treatment device of drinking water for supply to an organization or each house unit of residential building or a house unit.

Another object of the present invention is to provide a central treatment device of drinking water that may guarantee water sanitation and high efficiency of use.

Still another object of the present invention is to provide a central treatment device of drinking water that has automatic cleaning function and may guarantee water sanitation.

DETAILED DESCRIPTION OF PREFERRED EMBODIMENT

Figure 1:
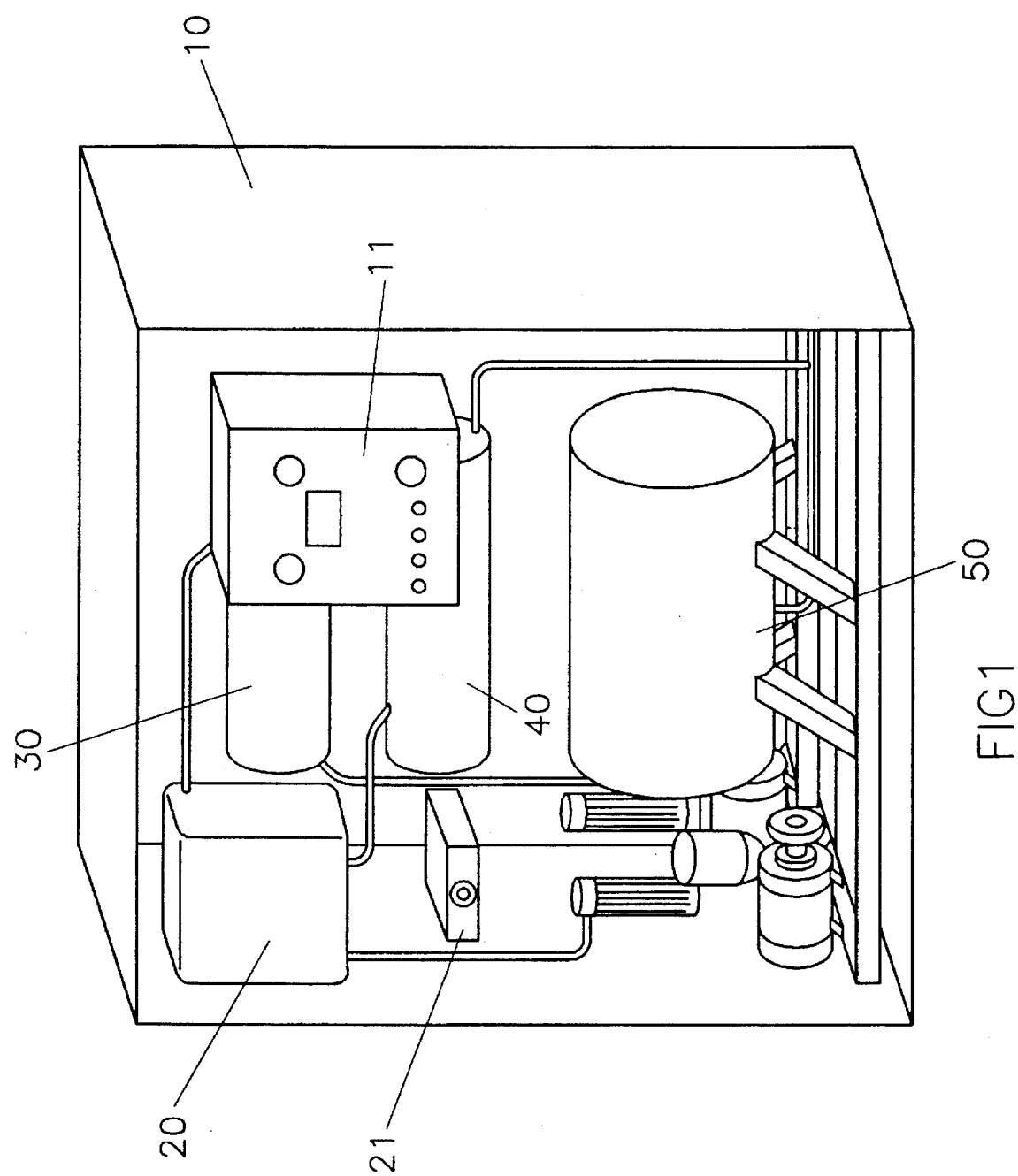
FIG. 1 is an elevational view of the structure of the present invention.

Referring to FIG. 1, the present invention comprises a frame 10, a water treatment device 20, a drinking cylinder 30, a use water cylinder 30, a water storage cylinder 50, an intake pump 61, and an outlet pump 64. Between said intake pump, water treatment device and each water cylinder has a number of tubings, filter nets and solenoid valves; on said frame 10 has a power control box 11 for the control of said solenoid valves, intake/outlet pumps and other electrical components.

Figure 2:
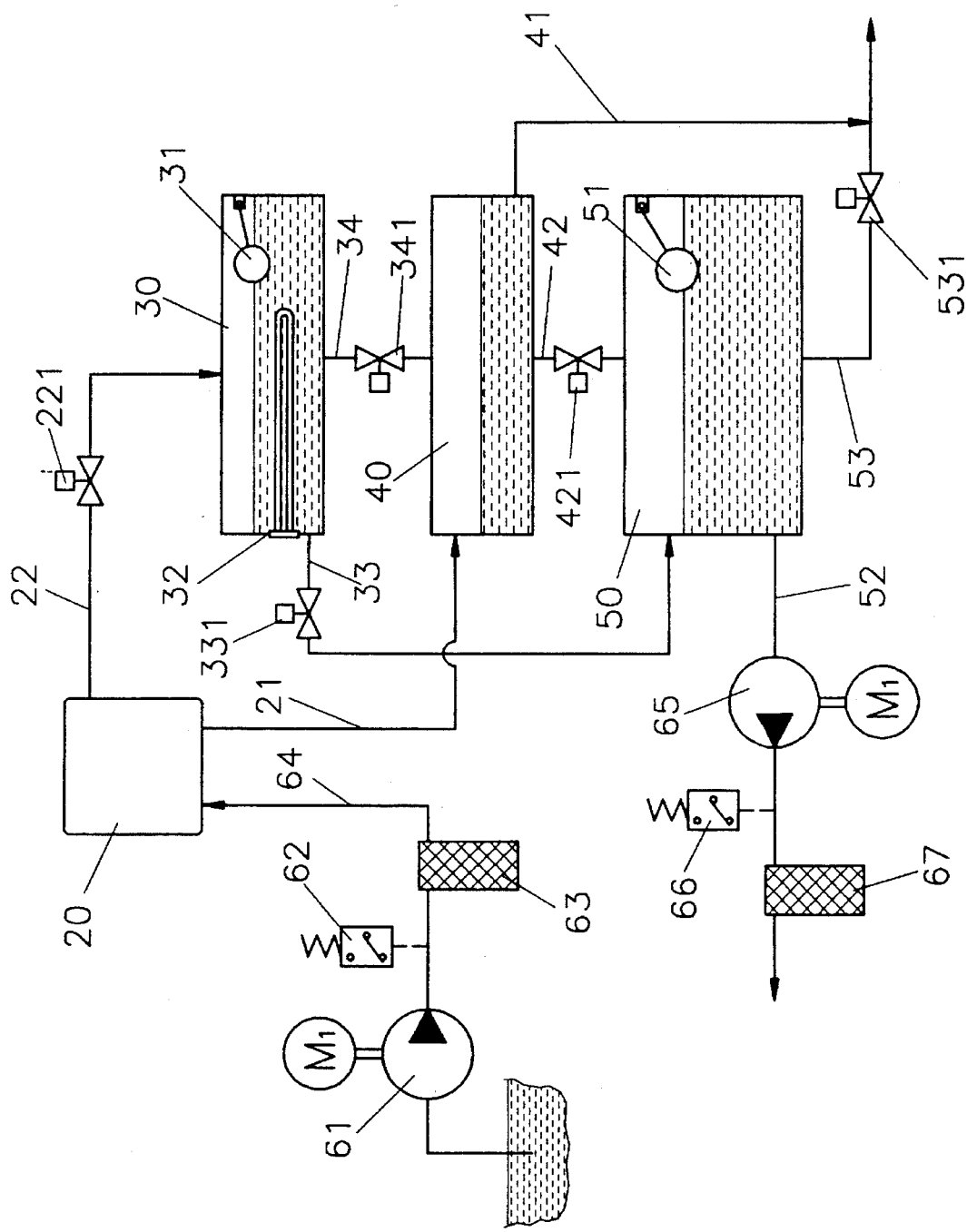
FIG. 2 is a layout showing the location of each member and tubing of the present invention.

Referring to FIG. 2, the intake pump 61 is provided for sending fresh water to water treatment device 20 for treatment by virtue of tubing 64. On the tubing 64 between said intake pump 61 and water treatment device 20 has a coarse filter net 63 for removing impurities from fresh water and because water pressure must be kept constant within the water treatment device 20 in order to develop normal effect (to be described later), on said outlet tubing 64 has a pressure sensor switch 62, and said pressure sensor switch 62 may be setting a pressure value, once water pressure in water treatment device 20 is dropping said pressure sensor switch 62 may detect it and start intake pump 61 to enable water pressure to rise within water treatment device 20.

The water treatment device 20 of the present invention is a water electrolysis device. Because it is a conventional art, the structure and principle will be omitted.

Upon the operation of electrolysis in said water treatment device must retain proper pressure and voltage in order to attain excellent result of electrolysis. The internal water pressure is controlled by means of pressure sensor switch 62 on said intake pump 61, and voltage is adjustable by means of voltage adjustment device 21 (FIG. 1). The water electrolysis device is better than any cation treatment device for removing chlorine gas, antiseptic solution from the water to guarantee safety of drinking water.

Separated from said water treatment device 20, acidic water containing chlorine gas and antiseptic solution will enter the used water cylinder 40, then the water in said use water cylinder 40 will enter the tap water tubing by virtue of tubing 41 for mixing into tap water for cleaning purpose. Alkaline drinking water separated from said water treatment device 20 will enter the drinking water cylinder 30 by virtue of tubing 22.

Said drinking water cylinder 30 has a water level sensor 31, and a heater 32 controlled by a temperature control switch. Wherein said water level sensor 31 may control the solenoid valve 221 of intake tubing 22 on said drinking water cylinder 30, enabling water level in said drinking water cylinder 30 to lower to a certain extent and said solenoid valve 221 will open to enable water level in said drinking water cylinder to rise back. Said heater 32 may adopt gas heater, electric heater or other type of heater which is provided for heating through the control by a temperature control switch (not shown), when water in said drinking water cylinder 30 is heated up to get boiling said temperature control switch may enable said heater 32 to stop heating and to enable the solenoid valve 331 to open while to cause boiling water flowing from drinking water cylinder 30 into water storage cylinder 50 by virtue of tubing.

Said storage cylinder 50 also includes a water level sensor 51 for the control of the solenoid valve 331 on intake tubing 33 of said storage cylinder 50 so as to control the solenoid valve 331 to close when said storage cylinder 50 is full to stop intaking.

After treated through said water treatment device 20 and boiled by drinking water cylinder 30, the drinking water in said storage cylinder 50 is totally safe for drinking for harmful substances such as chlorine gas and antiseptic solution have been removed away.

Drinking water in said drinking water cylinder 50 can be driven by an outlet pump 65 into drinking tubing for drinking by virtue of tubing 52. On the outlet tubing of said outlet pump 64 has a pressure sensor switch 66 for the control of water pressure on said drinking tubing, and it may be defined with a certain value, said pressure sensor switch 66 may control said outlet pump to start running when the pressure in said drinking tubing is lower than the defined value, enabling drinking water to be delivered into drinking tubing from storage cylinder 50 until tubing pressure has boosted up to the value it will close the motor power supply in order to attain the function of pressure regulation. Water driven by said outlet pump 65 into the tubing will pass by the fine filter net 67 for further removal of impurities.

In addition, to avoid accumulation of impurities in each water cylinder after used for a long time, the present invention has a CIP loop comprising a drain tube 34 leading from the bottom of said drinking water cylinder 30 to the use water cylinder 40; and drain tube 42 leading from the bottom of said use water cylinder 40 to storage cylinder 50, and drain tube 53 from said storage cylinder 50 to tap water tubing, and solenoid valves 221, 341, 421, 531 on drain tubes 34, 42 and 53.

Said CIP loop is controlled by a timer switch (not shown) in power control box 11. Said timer switch may define the time enabling to turn off power supply to outlet pump 65 for a fixed length of time to stop water supply while to start intake pump 61 for sending water to the drinking cylinder 30 and also open solenoid valves 221, 341, 421, 531, enabling water to enter drinking cylinder 30 for cleaning and to enter use water cylinder 40, then enter storage cylinder 50, then to be drained to tap water tubing by virtue of tubing 53. With said CIP loop impurities accumulated in each water cylinder through circulating flow cleaning.

Figure 3:
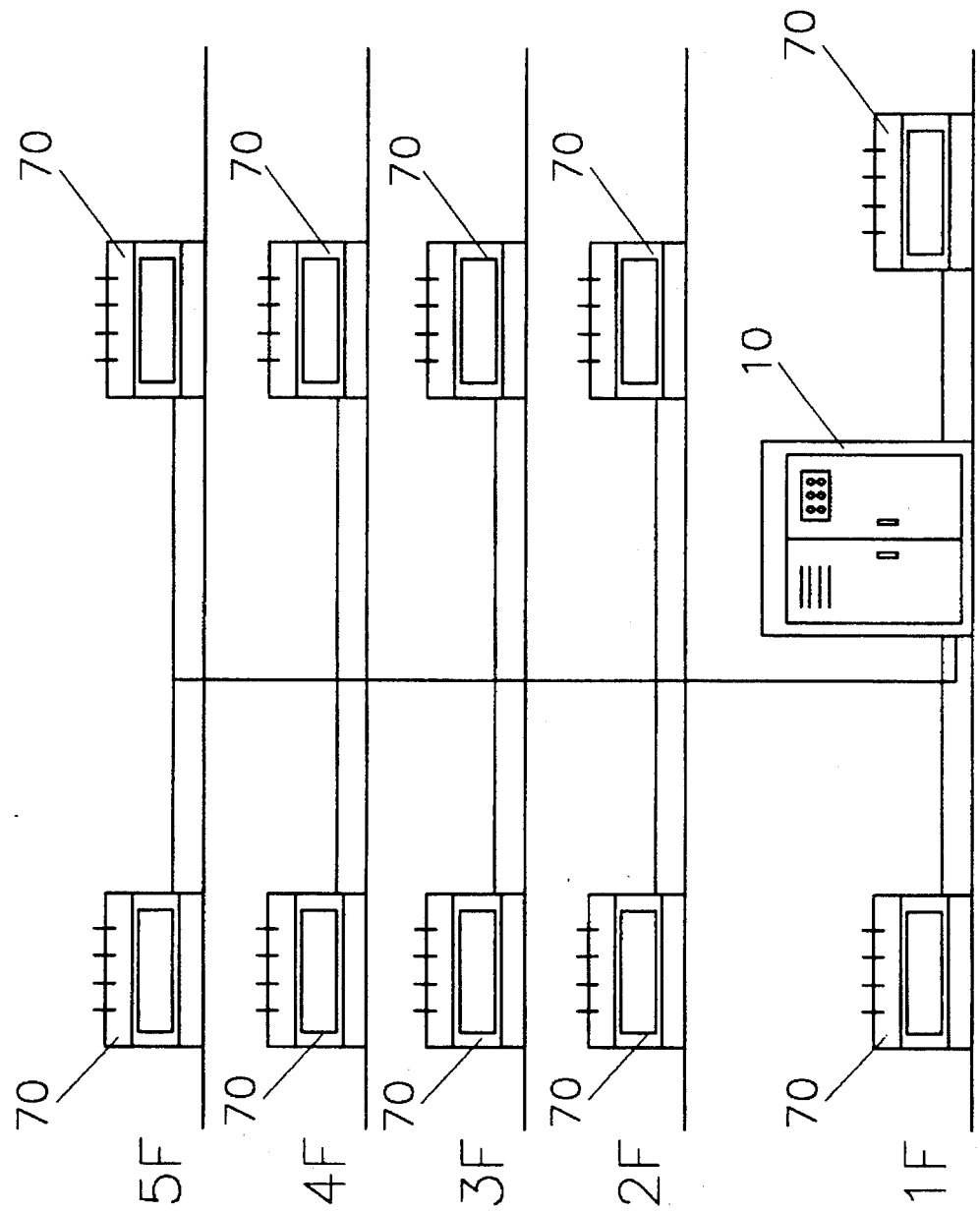
FIG. 3 is a diagramatic view showing the arrangement of the present invention installed in an organization or residence.

Referring to FIG. 3, the present invention is a package equipment of drinking system which is respectively distributed on each floor for the supply of drinking water to all users in a building. The present invention relates to use outlet pump 65 for driving drinking water to drinking tubing so that the central drinking water equipment may be mounted on the lowest floor or any other position, and it may use the outlet pump 65 for distributing drinking water to the drinking equipment 70 on each floor, not necessary for mounting on the top floor of a building like those conventional drinking equipment so that is flexible for installation. And pressure sensor 66 of said outlet pump 65 may be defined at proper pressure subject to the condition of use in order to obtain appropriate pressure and ensure stable and smooth supply of water to drinking equipment 70 on each floor without uneven pressure due to different floors.

Said outlet pump 65 may deliver drinking water to the drinking equipment 70 on each floor and for further filtration, and the heater and cooler in each drinking equipment 70 may heat and cool drinking water to supply hot and cold water.

The equipment of the present invention may ensure drinking water safety and may get fresh water boiled for supply to each drinking equipment so as to promote drinking water treatment efficiency and reduce energy consumption.

The present invention relates to use a central equipment to match each individual drinking equipment may greatly economize equipment cost and reduce maintenance job for the drinking equipment 70 on respective positions for maintenance is most concentrated on central treatment system of drinking water, if compared with unit drinking machine mounted on various positions of the first floor. Therefore it may also reduce maintenance cost and further ensure sanitation and safety of drinking equipment.

Another, the present invention may use the outlet pump 65 for delivering drinking water to each floor to keep outlet pressure stable. It is free from the limit to the place of installation and may ensure even pressure of water supply without the risk of excessive or overlow pressure due to different floors.

I claim:

1. A drinking water supply system comprising:

a frame body;

an intake pump for pumping untreated water from a water source through a first filtering means to a water treatment device, said water treatment device for an electrolysis process to treat said water, operation of said intake pump being controlled by a first pressure sensor switch;

a drinking water cylinder for receiving water suitable for drinking from said water treatment device, said water when contained in said drinking water cylinder being controlled by a first solenoid valve and a first water level sensor, said first water level sensor activating said first solenoid valve to allow water suitable for drinking to flow from said water treatment device to said drinking water cylinder when a level of said water suitable for drinking in said drinking water cylinder falls below a level defined by an operator of said system, said drinking water cylinder further including heating means to heat said water suitable for drinking to its boiling point;

a used water cylinder for receiving acidic water from said water treatment device, an outlet of said used water cylinder being connected to said water source;

a storage cylinder for receiving water after it has been boiled in said drinking water cylinder, and adapted so that said water flows from said drinking water cylinder to said storage cylinder which is controlled by a second solenoid valve and a temperature sensitive switch, said switch activating said heater when the temperature of water in said drinking water cylinder is below its boiling point, said switch activating said second solenoid valve when said water in said drinking water cylinder has boiled so that said water flows into said storage cylinder; and an outlet pump for pumping water from said storage cylinder through a second filtering means to users of said system, the operation of said outlet pump being controlled by a second pressure sensor switch; wherein water is pumped from said water source into said water treatment device where it is subjected to electrolysis, resulting water suitable for drinking flows into said drinking water cylinder where it is boiled and then pumped into said storage cylinder where fully treated water accumulates until it is required by said users of said system.

2. The drinking water supply system of claim 1 wherein:

said drinking water cylinder and said storage cylinder are in communication with said used water cylinder, and said storage cylinder includes drain means such that acidic water from said used water cylinder may be pumped through said drinking water cylinder and through said storage cylinder and thereafter through said drain means so that said acidic water is used to clean said drinking water cylinder and said storage cylinder.

* * * * *